US007656853B2

(12) United States Patent
Albulet

(10) Patent No.: US 7,656,853 B2
(45) Date of Patent: Feb. 2, 2010

(54) REDUCING POWER CONSUMPTION OF A WIRELESS DEVICE

(75) Inventor: Mihai Albulet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/020,234

(22) Filed: Dec. 27, 2004

(65) Prior Publication Data

US 2006/0140166 A1    Jun. 29, 2006

(51) Int. Cl.
*H04J 3/16* (2006.01)
*H04M 1/00* (2006.01)
*H04B 1/38* (2006.01)
*H04B 1/04* (2006.01)
*H04B 1/16* (2006.01)
*H01Q 11/12* (2006.01)

(52) U.S. Cl. .................. 370/346; 455/574; 455/127.5; 455/343.2; 455/343.4; 713/320

(58) Field of Classification Search .................. 370/346, 370/449, 498; 455/574, 343.2, 127.5; 713/320
See application file for complete search history.

(56) References Cited

U.S. PATENT DOCUMENTS

| 5,095,308 | A  | * | 3/1992  | Hewitt ........................ 340/7.38 |
| 6,236,850 | B1 | * | 5/2001  | Desai ........................ 455/343.2 |
| 6,389,010 | B1 | * | 5/2002  | Kubler et al. ................ 370/353 |
| 6,441,747 | B1 | * | 8/2002  | Khair et al. ............ 340/870.16 |
| 6,996,100 | B1 | * | 2/2006  | Haartsen ..................... 370/389 |
| 7,330,736 | B2 | * | 2/2008  | Redi ........................ 455/553.1 |
| 7,425,945 | B2 | * | 9/2008  | Arrigo et al. ................. 345/165 |
| 2001/0002906 | A1 | * | 6/2001 | Rune .......................... 370/345 |
| 2002/0003812 | A1 | * | 1/2002 | Haartsen ..................... 370/474 |
| 2002/0028657 | A1 | * | 3/2002 | Davies ........................ 455/41 |
| 2002/0082060 | A1 | * | 6/2002 | Kang et al. .................. 455/574 |
| 2002/0118653 | A1 | * | 8/2002 | Lomp et al. ................. 370/311 |
| 2002/0136268 | A1 | * | 9/2002 | Gan et al. .................... 375/133 |
| 2002/0178250 | A1 | * | 11/2002 | Haartsen ..................... 709/223 |
| 2003/0031208 | A1 | * | 2/2003 | Anehem et al. ............. 370/474 |
| 2003/0076842 | A1 | * | 4/2003 | Johansson et al. ........... 370/401 |
| 2003/0139191 | A1 | * | 7/2003 | Koo .......................... 455/461 |
| 2004/0218620 | A1 | * | 11/2004 | Palm et al. ................... 370/445 |
| 2004/0266494 | A1 | * | 12/2004 | Ruuska et al. .............. 455/574 |
| 2005/0122990 | A1 | * | 6/2005 | Parys ......................... 370/449 |

OTHER PUBLICATIONS

Wang, H. "Overview of Bluetooth Technology", Jul. 3, 2001, Penn State, Entire Document.*

* cited by examiner

*Primary Examiner*—Rafael Pérez-Gutiérrez
*Assistant Examiner*—Allahyar Kasraian
(74) *Attorney, Agent, or Firm*—Woodcock Washburn LLP

(57) ABSTRACT

The present invention provides a system and method for conserving power consumption of a wireless device such as a BLUETOOTH slave device. A master device polls a slave device in a polling period. The slave responds by transmitting a data packet. If there is an error in transmission of the data, the master device may transmit an ARQ (Automatic Repeat Request) to the slave device in a TIMEOUT period to indicate that the data packet was not received. The slave device may reduce power consumption or power off during that TIMEOUT and receive a retransmit ARQ in a subsequent polling period.

21 Claims, 8 Drawing Sheets

REDUCING POWER CONSUMPTION OF A WIRELESS DEVICE

FIELD OF THE INVENTION

This invention relates to power management in electronic devices that communicate via a wireless link and, in particular, to wireless devices communicating via a wireless protocol having reserved time slots for error recovery.

BACKGROUND OF THE INVENTION

Wireless communication between electronic devices is increasingly common. One example is a computer in communication with a mouse, keyboard and other peripheral components. To avoid excessive connecting cables and otherwise provide convenience, many mice, keyboard, and other components are now wireless. Although there are several standards for wireless communication, BLUETOOTH is becoming the de facto standard for many applications. Developed by Bluetooth SIG, Inc., the BLUETOOTH wireless specification establishes protocols and standards for two-way wireless communication between electronic devices using relatively low power radio communication. BLUETOOTH is described by, e.g., "Specification of the Bluetooth System" (versions 1.1 and 1.2), "Human Interface Device (HID) Profile version 1.0" and various other documents available from Bluetooth SIG, Inc. at <http://www.bluetooth.com>. Among other things, BLUETOOTH provides for two-way radio links between multiple devices in a short-range radio network called a "piconet."

A BLUETOOTH piconet typically includes a "master" (e.g., a personal computer) receiving input from one or more "slaves" (e.g., a wireless mouse or a wireless keyboard). A series of inquiry, paging and other messages are then exchanged between the master and slave(s). The BLUETOOTH protocol includes a special provision, called SNIFF, to enable some slave devices to reduce their power consumption below what they would normally consume in "active" mode on a piconet. Such devices are typically those which have modest levels of data flow and which can tolerate response latencies of tens or hundreds of milliseconds. In SNIFF mode, the master periodically polls each slave and requests that the slave send data. In response, each slave may transmit a data packet containing either a transmission of user data or a "NULL" to indicate that the slave has no user data. User data may include, for example, a mouse movement or a button press. The NULL response is necessary so that the master knows the slave is still part of the piconet. While in SNIFF mode, there is typically a longer interval between master and slave communication than is the case with more active communication modes. In between communications, the slave can shut down—"go to sleep"—and thus save power until it is time to receive and respond to the next transmission from the master. However, provision must still be made to recover a possible loss of data from the slave due to interference or similar difficulty. To handle this problem, a second set of slots, adjacent to the first and called "timeout" slots, are provided.

FIG. 1 illustrates BLUETOOTH SNIFF mode. SNIFF slots are time slots determined between the master and the slave and may be any one of a variety of agreed upon length of time or frequency. For purposes of the present invention, the SNIFF slots are referred to as "SNIFF periods" and the timeout slots are referred to as "TIMEOUT periods." In this example, simplified SNIFF periods and TIMEOUT periods are shown. However, it is understood that the frequency and duration of SNIFF periods and TIMEOUT periods, as well as the number of TIMEOUT periods following a SNIFF period, may vary based on negotiation between the master and the slave devices, for example. An ellipsis is depicted in the figures to illustrate varying numbers of time slots between SNIFF periods, as well as intervening periods between the end of a TIMEOUT period and the next SNIFF period.

The master device (e.g., a computer) and a slave device (e.g., a wireless keyboard or mouse) commence communication at a sniff slot depicted as "SNIFF period 1" in FIG. 1. In the first time slot of SNIFF period 1, the master device polls the slave device by sending a POLL packet to the slave device. In response to the POLL packet from the master device, the slave responds in the second time slot of SNIFF period 1 by either sending a data packet or a "NULL" to the master device. In this example, the slave sends a data packet (Data$_1$) which may contain user data, such as a mouse movement or button press, which is successfully received by the master. The master confirms the successful reception by sending a NULL during the first slot of TIMEOUT period 1. The slave device listens during the first slot of TIMEOUT period 1 following SNIFF period 1. The slave device powers off in the second time slot of TIMEOUT period 1, and remains off until the beginning of the next SNIFF period.

FIG. 1 also illustrates master and slave device communication when a transmission from a slave device is not received at the master device. This example is illustrated in SNIFF period 2 and TIMEOUT period 2 of FIG. 1. In the first time slot of SNIFF period 2, the master device polls the slave device by sending a POLL packet to the slave device (which is powered on) while the slave device listens to the piconet. In response to receiving the POLL packet from the master device, the slave device responds by sending a data packet (Data$_2$) to the master device in the second time slot. In this example, the master device fails to receive the transmission. This failure of transmission may be due to a variety of factors such as, but not limited to, an error in transmission or impaired transmission conditions. Because the transmission was unsuccessful, the master device transmits an ARQ (Automatic Repeat Request) to the slave device. Transmitting an ARQ to the slave device causes the slave device to re-transmit the data packet (Data) in the second time slot of TIMEOUT period 2.

If during a SNIFF period, the master sends a POLL packet to the slave device but the slave device does not have data at that time to transmit to the master device, the slave device may send a NULL packet to the master device. This is illustrated in SNIFF period 3 and TIMEOUT slot 3 of FIG. 1. In this example, the master device polls the slave device by sending a POLL packet to the slave device during the first time slot of SNIFF period 3. In this case, the slave device does not have data to transmit to the master device. Therefore, in response to receiving the POLL packet from the master device, the slave device responds by sending a NULL packet (NULL) to the master device in the second time slot of SNIFF period 3. After the master device receives the NULL packet (NULL) from the slave device, communication between the master device and the slave device terminates. The slave device does not have to listen during the first time slot of TIMEOUT period 3. Because the master device does not transmit as ARQ or other packet to the slave device during the first time slot of TIMEOUT period 3, the slave device powers off during the second time slot of TIMEOUT period 3.

If there is no error in transmission of data from the slave device to the master device during the SNIFF period, there is no need for the slave device to waste power by remaining powered on during the TIMEOUT PERIOD(S). By maintaining power to the slave device during this period, the slave device wastes power. Because the slave device is likely a battery-operated device, battery power may be unnecessarily drained. Thus, there remains a need in the art for eliminating unnecessary power use during timeout.

SUMMARY OF THE INVENTION

The present invention provides a system and method for conserving power consumption of a wireless device. In one embodiment, master device (e.g., a computer) polls a slave device (e.g., a mouse) in a polling period. The mouse may respond by transmitting a data packet to the computer. The slave may then reduce power during timeout periods regardless of whether the master received the slave's transmitted data. If there is an error in transmission of the data, the computer may request retransmission in the next polling period. The mouse may respond to polling packets or requests for data retransmission from the computer during polling periods and may reduce power consumption or power off during intervening time periods. In any polling period, the mouse may retransmit data packets that failed to successfully transmit previously. The mouse may also transmit data packets during supplemental time periods associated with the polling periods, such as TIMEOUT periods. In another embodiment of the present invention, the mouse does not reduce power consumption or power off if transmission of a predetermined number of consecutive data packets failed to transmit successfully. The mouse may then resume power reduction (or power off) when a sufficient number of data packets are successfully transmitted.

These and other features and advantages of the present invention will be readily apparent and fully understood from the following detailed description of preferred embodiments, taken in connection with the appended drawings.

DETAILED DESCRIPTION OF THE PREFERRED EMBODIMENTS

The present invention provides systems and methods for managing power consumption in a wireless device in communication with another wireless device. The invention is described by example of a desktop computer and wireless computer mouse communicating according to the BLUETOOTH standard. However, the invention is not limited to these specific types of devices or to the BLUETOOTH standard. The invention may also be implemented with numerous other general purpose or special purpose computing system environments or configurations, with other types of devices, and in devices communicating via other wireless communication standards and/or protocols.

Figure 2:
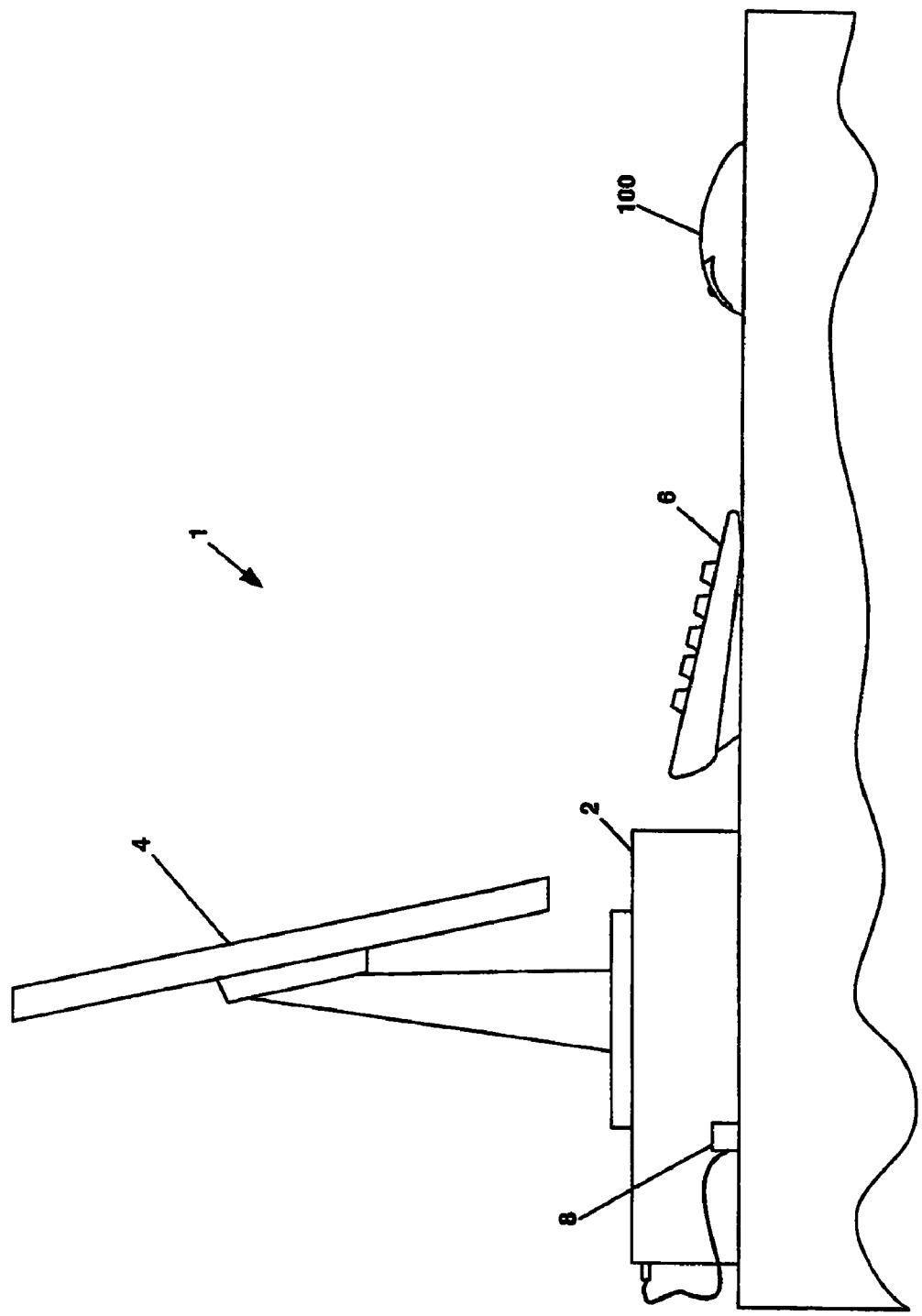
FIG. 2 is a view of a computing system environment implementing at least one embodiment of the invention.

FIG. 2 illustrates one example of a suitable computing system environment 1 in which the invention may be implemented. Shown in FIG. 2, in side view, are a desktop computer 2 having a monitor 4 and keyboard 6. Also shown is wireless mouse 100, which communicates with computer 2 via an RF transceiver within dongle 8. Dongle 8 is connected to a USB or other port of computer 2, and is located externally to computer 2 (as shown). In at least one embodiment, dongle 8 houses the required electronic components and firmware for receiving BLUETOOTH communications from and transmitting BLUETOOTH communications to remote devices (such as a mouse or keyboard). In at least one embodiment, components within dongle 8 convert received BLUETOOTH data to a format which may be passed to computer 2 via a USB port, and similarly convert USB data to a format which may be transmitted by BLUETOOTH link. In particular, dongle 8 contains components and firmware needed to implement the radio, baseband, link manager and L2CAP BLUETOOTH layers for computer 2. In other embodiments, electronic components and firmware for implementing BLUETOOTH communications may be internal to computer 2 and directly connected to a system or other bus without an intermediate USB connection.

Figure 3:
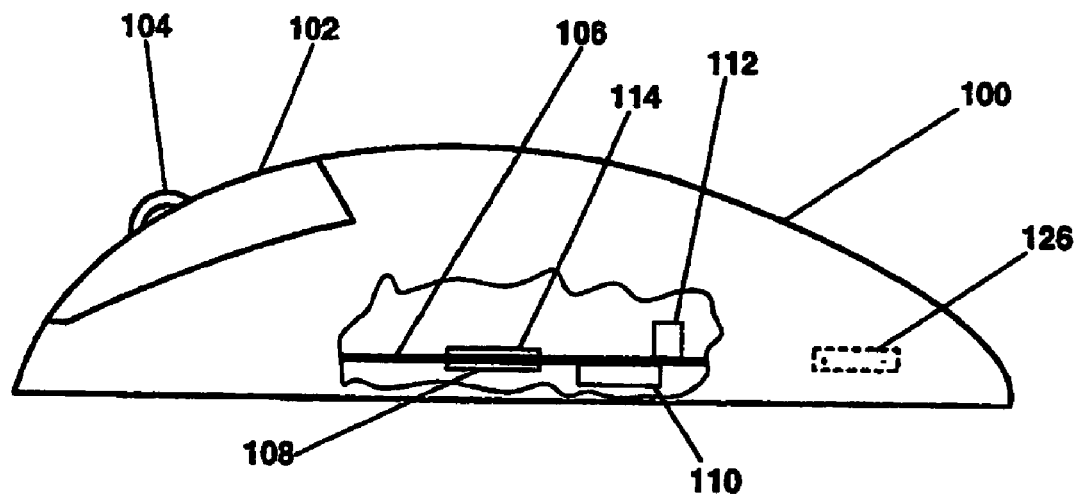
FIG. 3 is a cutaway side view of the wireless mouse of FIG. 2.

In one embodiment, the input or slave device in a BLUETOOTH piconet is a mouse. FIG. 3 is a side, cutaway view of mouse 100. Mouse 100 may have one or more buttons 102 which can be pressed by a user, a scroll wheel 104, or other types of input controls which can be actuated by a user. The number, arrangement and types of input controls shown are merely exemplary, and other combinations and arrangements are within the scope of the invention. The operation of switches, scroll wheels and other types of input controls is known in the art and thus not further described herein. Mouse 100 may also have one or more internal circuit boards 106 or other substrates upon which various electronic components are connected and physically supported. These components may include an imaging array 108, a LED or laser source 110, a RF antenna 112, a controller 114 and a battery/power source 126. Other components, not shown in FIG. 3, may include memory and other electrical components. LED or laser source 110 emits light which illuminates an area of a desktop or other surface, and which is imaged by imaging array 108.

Images from array 108 are then compared to detect movement of mouse 100 across the desktop or other surface.

Figure 4:
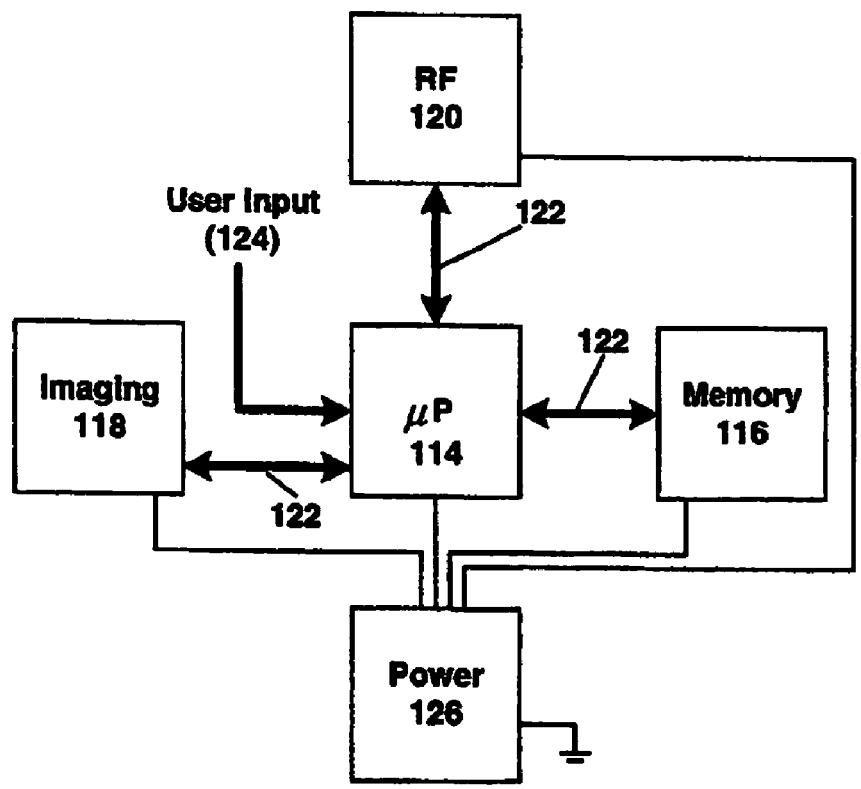
FIG. 4 is a block diagram for circuitry of the mouse of FIGS. 2 and 3.

FIG. 4 is a block diagram of the internal circuitry of mouse 100 according to at least one embodiment of the invention. Operation of mouse 100 is controlled by a microprocessor (μP) controller 114. Although controller 114 is shown as a microprocessor, controller 114 could alternatively include state machine circuitry or other suitable components capable of controlling operation of mouse 100 as described herein. Controller 114 communicates with memory 116. Memory 116, which may include volatile and non-volatile memory, is a machine-readable medium used for storage of software (or firmware) instructions, imaging data and configuration settings. Memory 116 may include a rewritable non-volatile component, such battery-backed SRAM or EEPROM, and/or a non-rewritable component such as ROM. Controller 114 also controls LED or laser source 110 (FIG. 3) and imaging array 108 (FIG. 3), as well as other imaging elements, all of which are represented collectively by block 118. Controller 114 further controls RF communication circuitry 120, and passes data to RF communication circuitry 120 for communication to computer 2 over antenna 112 (FIG. 3). Similarly, data communicated to mouse 100 is received via antenna 112 (FIG. 3) and RF circuitry 120, and transmitted to controller 114. Controller 114 communicates with imaging elements 118, RF circuitry 120 and memory 116 over one or more buses 122, shown collectively as bold bi-directional arrows. Controller 114 also receives electrical signals that correspond to a user's actuation of a mouse button 102 (FIG. 3), scroll wheel 104 (FIG. 3) or other input control. These electrical signals are represented collectively by User Input 124. The various electrical components of mouse 100 are powered by a power source 126, which could include one or more batteries.

Although FIG. 4 shows controller 114, imaging circuitry 118, RF circuitry 120 and memory 116 as discrete components, this need not be the case. For example, one or more of these components might be contained in a single Integrated Circuit (IC) or other component. As another example, controller 114 may include internal program memory such as ROM. Similarly, the herein described functions of these components could be distributed across additional components (e.g., multiple controllers or other components).

In one example of the present invention, mouse 100 (the slave) reduces power consumption in SNIFF mode in a BLUETOOTH connection with computer 2 (the master). For purposes of explanation, a simplified power consumption method and system in which the slave device reduces power consumption or powers off to preserve power consumption is demonstrated. It is understood, however, that devices according to other embodiments of the invention may have additional and/or more complex power management algorithms.

When the present invention is applied to a wireless network, such as in a BLUETOOTH piconet, a slave wireless device may conserve power without requiring modification to the master device. For example, the different BLUETOOTH components may be produced from different sources or manufacturers. Modification of one device (e.g., a mouse) without requiring modification of an associated device (e.g., a computer) increases the likelihood of preserving compatibility among the devices.

Figure 1:
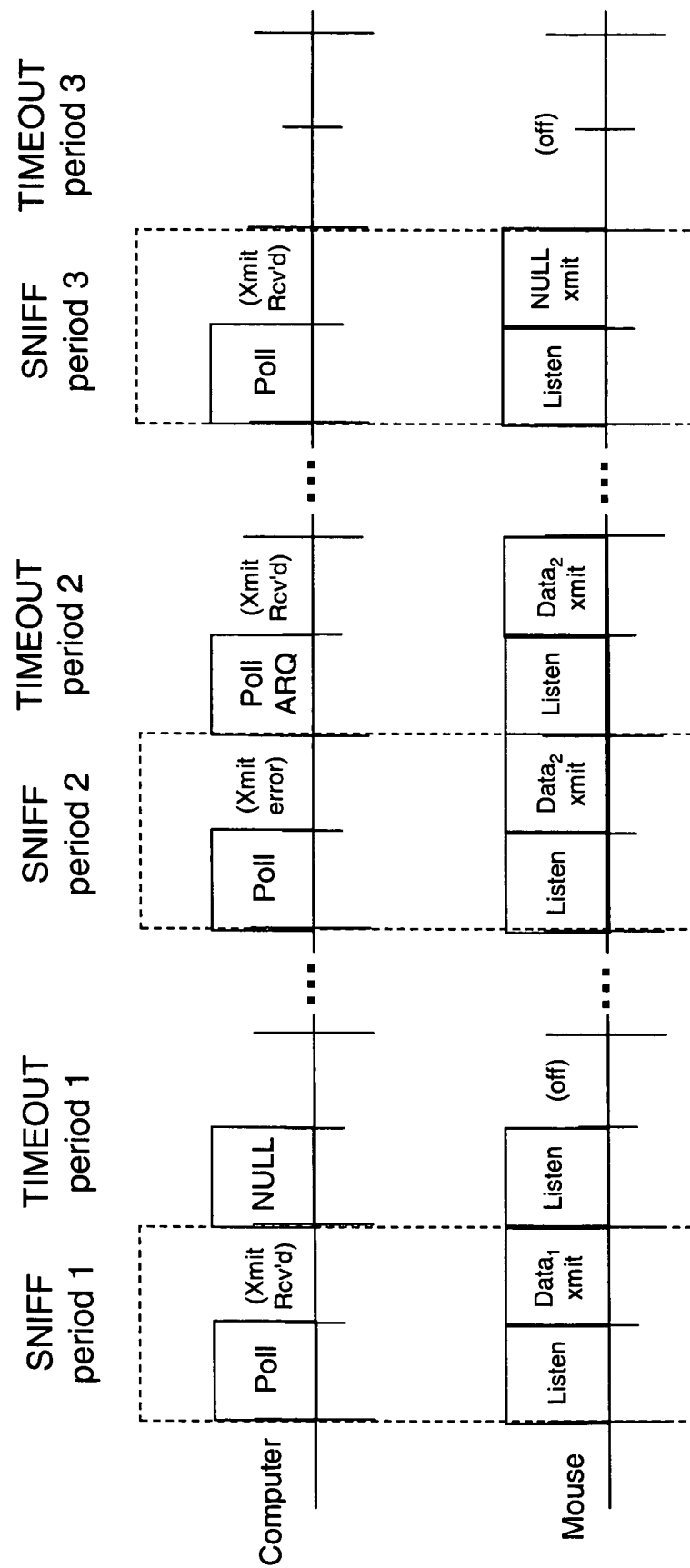
FIG. 1 is a diagram showing an example of the prior art SNIFF mode operation in the BLUETOOTH protocol.
Figure 5:
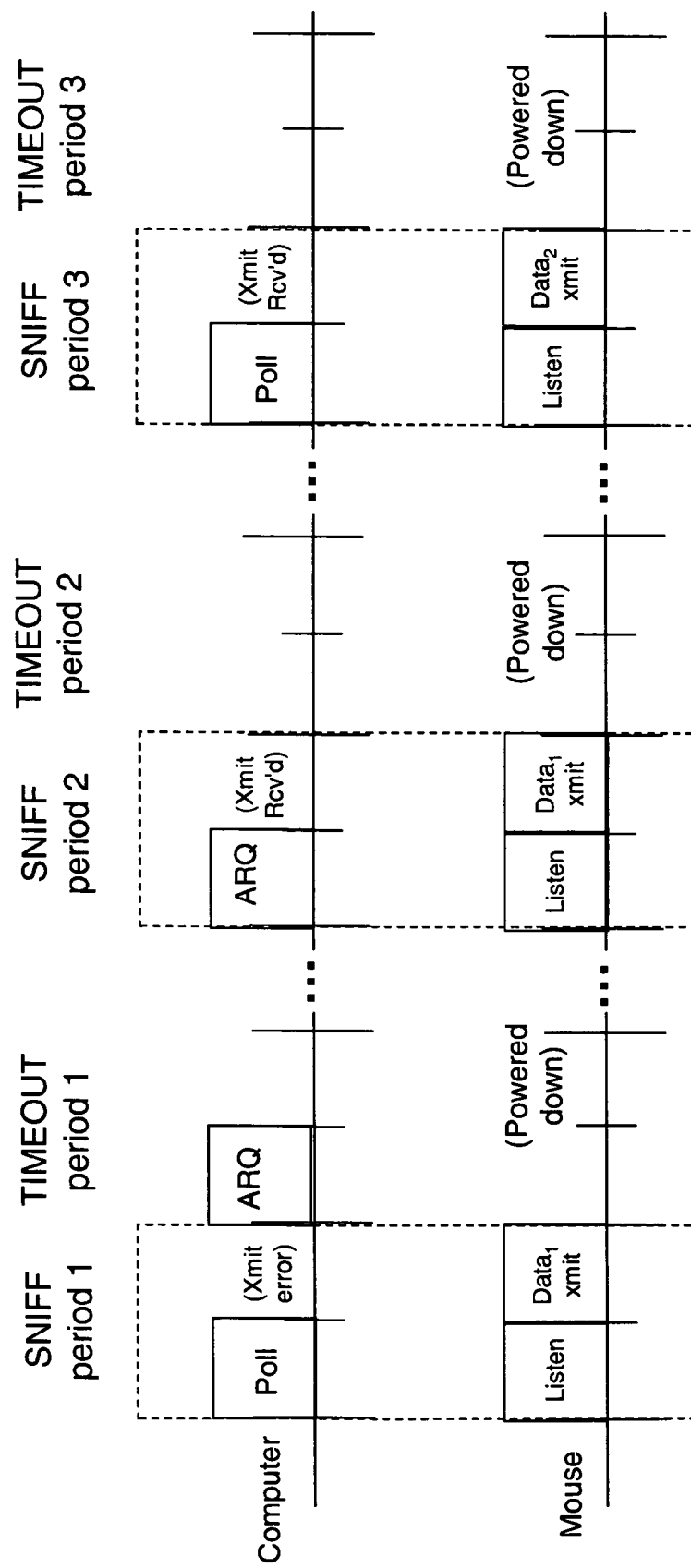
FIG. 5 is a diagram showing an example of power management of a slave device, and in which a slave device transmits a data packet to a master device in one polling period and retransmits the data packet in the subsequent polling period while reducing power consumption in the time interval between the two polling periods.

FIG. 5 illustrates one example of the present invention. As shown in FIG. 5, computer 2 transmits a POLL packet to mouse 100 in the first time slot of SNIFF period 1. Mouse 100 listens to the piconet during the first time slot of SNIFF period 1 and receives the POLL packet from the computer 2. In this example, mouse 100 has a data packet ($Data_1$) to transmit to computer 2 and transmits the data packet to computer 2 in the second time slot of SNIFF period 1. The data packet may contain user data such as a mouse movement or button press. After transmitting the data packet containing user data ($Data_1$), mouse 100 powers down its transceiver in the first time slot of TIMEOUT period 1. Mouse 100 remains in this powered down condition until the next SNIFF period (illustrated as SNIFF period 2 in this example). As previously indicated in connection with FIG. 1, the ellipses in FIGS. 5-9 indicate that, e.g., there may be additional time periods between the conclusion of a TIMEOUT period and the beginning of the next SNIFF period.

As also shown in FIG. 5, computer 2 did not properly receive the $Data_1$ transmission by mouse 100 during SNIFF period 1. For example, there may be interference or the reception of the transmission may be otherwise impaired. Accordingly, and as prescribed by the BLUETOOTH protocol, computer 2 sent an ARQ (Automatic Repeat Request) to mouse 100 in the first time slot of TIMEOUT period 1. However, because mouse 100 has powered down, mouse 100 does not receive the ARQ or respond to the ARQ from computer 2.

When the next SNIFF period occurs (SNIFF period 2 in this example), and not having received a response to the ARQ transmitted immediately after the prior SNIFF period, computer 2 transmits another ARQ in the first time slot of SNIFF period 2. This transmission by the master is part of the existing BLUETOOTH protocol. Because mouse 100 has powered up to listen to the piconet during SNIFF period 2, mouse 100 receives the ARQ from the computer 2 in the first time slot of SNIFF period 2. In this example, mouse 100 does not have additional user data to be transmitted in SNIFF period 2. If the $Data_1$ packet had been successfully received by computer 2, mouse 100 would ordinarily transmit a NULL packet in response to a POLL packet from computer 2 in SNIFF period 2. In the present example, however, mouse 100, receives the ARQ from computer 2 in SNIFF period 2. Accordingly, mouse 100 retransmits the data packet (in this case, the $Data_1$ packet) that was previously transmitted by mouse 100 in SNIFF period 1 but not received by computer 2. By the end of SNIFF period 2, mouse 100 has transmitted all of its currently pending data packets to computer 2 and powers down in the first time slot of TIMEOUT period 2. Mouse 100 remains powered down until the next SNIFF period (SNIFF period 3). The delay of transmission of the data packet ($Data_1$) is merely one SNIFF interval which is imperceptible to the average user.

FIG. 5 further illustrates computer 2 transmitting another POLL packet to mouse 100 in SNIFF period 3. At this point, mouse 100 has another data packet ($Data_2$) to be transmitted to computer 2 in SNIFF period 3 and transmits $Data_2$ to computer 2 in the second time slot of SNIFF period 3. After transmitting $Data_2$, mouse 100 powers down in TIMEOUT period 3. In this way, power of the slave device is conserved by an amount depending on the frequency or occurrence of errors of data during SNIFF periods.

Figure 6:
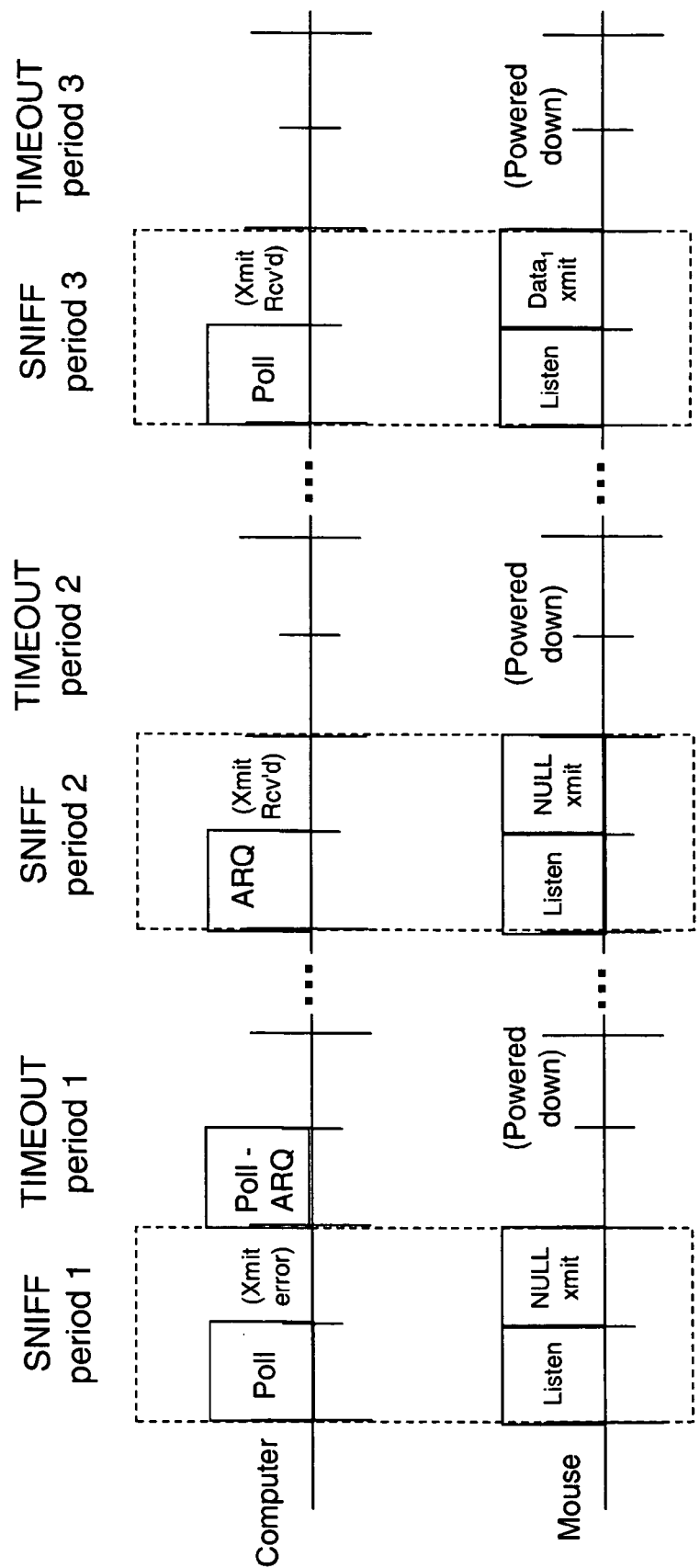
FIG. 6 is a diagram showing another example of power management of a slave device, and in which a slave device transmits a NULL packet in a first polling period that is not successfully received by the master device and reduces power consumption in time periods between polling periods.

FIG. 6 demonstrates another example of the present invention in which a computer 2 transmits a POLL packet to mouse 100 in the first time slot of SNIFF period 1. Mouse 100 listens to the piconet during the first time slot of SNIFF period 1 and receives the POLL packet from the computer 2. In this example, mouse 100 does not have user data to transmit to computer 2 and therefore transmits a NULL packet in the second time slot of SNIFF period 1. After transmitting the NULL packet, mouse 100 powers down its transceiver in the first time slot of TIMEOUT period 1. Mouse 100 remains in this powered down condition until the next SNIFF period (illustrated as SNIFF period 2 in this example).

As also shown in FIG. 6, computer 2 did not properly receive the NULL transmission by mouse 100 during time slot 1 of SNIFF period 1. Accordingly, computer 2 sends an ARQ (Automatic Repeat Request) to mouse 100 in the first time slot of TIMEOUT period 1. However, because mouse 100 has powered down, mouse 100 does not receive the ARQ or respond to the ARQ from computer 2.

When the next SNIFF period occurs (SNIFF period 2) and not having received a response to the ARQ transmitted immediately after the prior SNIFF period, computer 2 transmits the ARQ in the first time slot of SNIFF period 2. Because the mouse 100 has powered up to listen to the piconet during SNIFF period 2, the mouse 100 receives the ARQ from the computer 2 in the first time slot of SNIFF period 2 and responds by retransmitting the data packet originally transmitted but not received by computer 2 in SNIFF period 1. In this example, the previously transmitted packet is a NULL packet.

In the example of FIG. 6, mouse 100 does not have user data to be transmitted in SNIFF period 2 so mouse 100 transmits a NULL packet in the second time slot of SNIFF period 2, after which mouse 100 powers down in the first time slot of TIMEOUT period 2 to conserve power. In the next SNIFF period of FIG. 6 (SNIFF period 3), mouse 100 transmits user data ($Data_1$) to computer 2. Mouse 100 then conserves power by powering down during TIMEOUT period 3.

Figure 7:
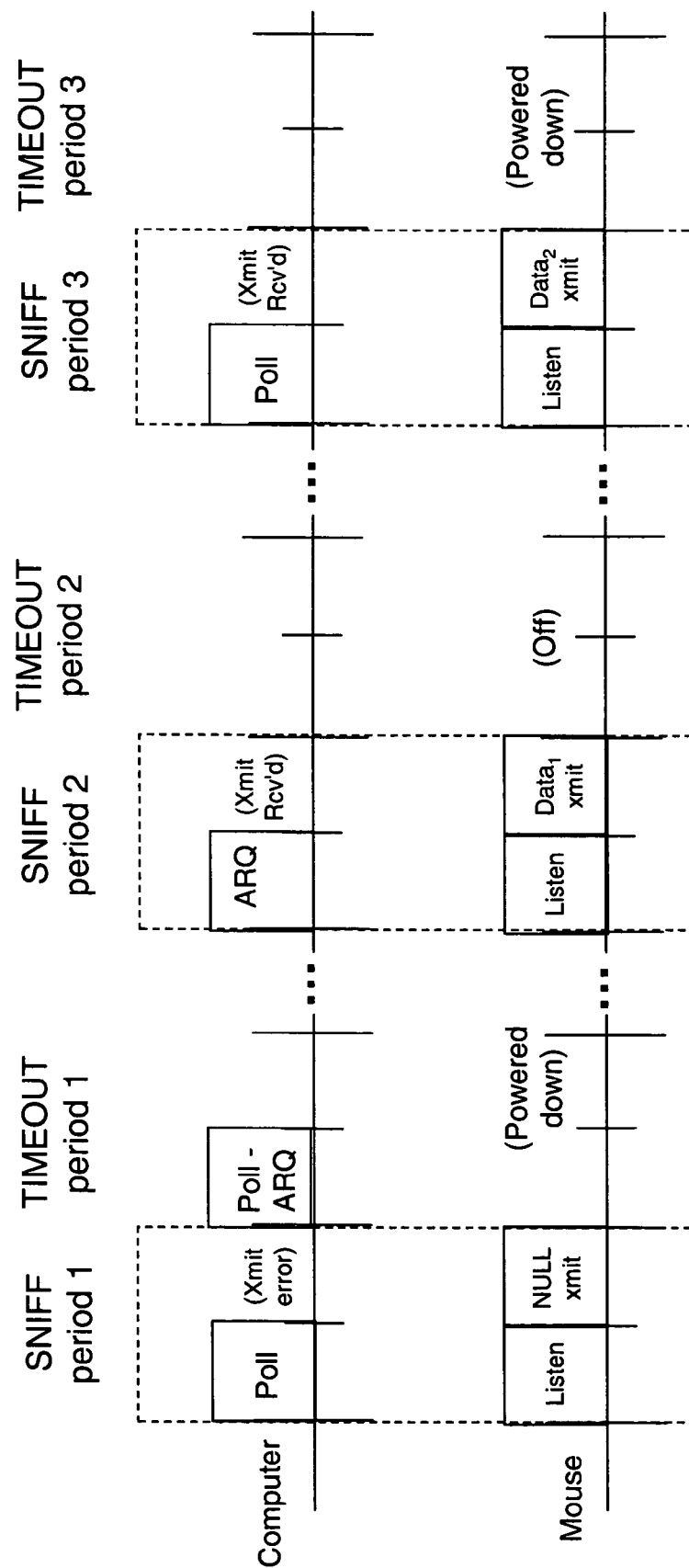
FIG. 7 is a diagram showing another example of power management of a slave device, and in which a slave device transmits a NULL packet in a first polling period which is not received by a master device, transmits a data packet in the second polling period and reduces power consumption in the time period between the first and second polling periods.

FIG. 7 illustrates another example of the present invention. In this example, computer 2 transmits a POLL packet to mouse 100 in the first time slot of SNIFF period 1.

Because mouse 100 does not have user data to transmit to computer 2 in this example, mouse 100 transmits a NULL packet in the second time slot of SNIFF period 1. After transmitting the NULL packet, mouse 100 powers down its transceiver in the first time slot of TIMEOUT period 1. Mouse 100 remains in this powered down condition until the next SNIFF period (illustrated as SNIFF period 2 in this example).

As also shown in FIG. 7, computer 2 did not properly receive the NULL transmission by mouse 100 during time slot 1 of SNIFF period 1. Accordingly, computer 2 sends an ARQ (Automatic Repeat Request) to mouse 100 in the first time slot of TIMEOUT period 1. However, because mouse 100 has powered down, mouse 100 does not receive the ARQ or respond to the ARQ from computer 2.

When the next SNIFF period occurs (SNIFF period 2) and not having received a response to the ARQ transmitted immediately after the prior SNIFF period, computer 2 transmits the ARQ in the first time slot of SNIFF period 2. Because the mouse 100 has powered up to listen to the piconet during SNIFF period 2, the mouse 100 receives the ARQ from the computer 2 in the first time slot of SNIFF period 2.

In this case, mouse 100 now has a data packet ($Data_1$) of user data to be transmitted to computer 2 in SNIFF period 2. For example, a user may have completed pressing of a mouse button in the interval between the end of SNIFF period 1 and beginning of SNIFF period 2. Instead of retransmitting the NULL packet transmitted in SNIFF period 1, mouse 100 transmits the intervening data packet ($Data_1$) of user data in the second time slot of SNIFF period 2. Mouse 100 then powers down in the first time slot of TIMEOUT period 2. FIG. 7 further illustrates a subsequent transmission of a data packet ($Data_2$) of user data in the subsequent SNIFF period 3 and power down of mouse 100 after transmission of the data packet.

Figure 8:
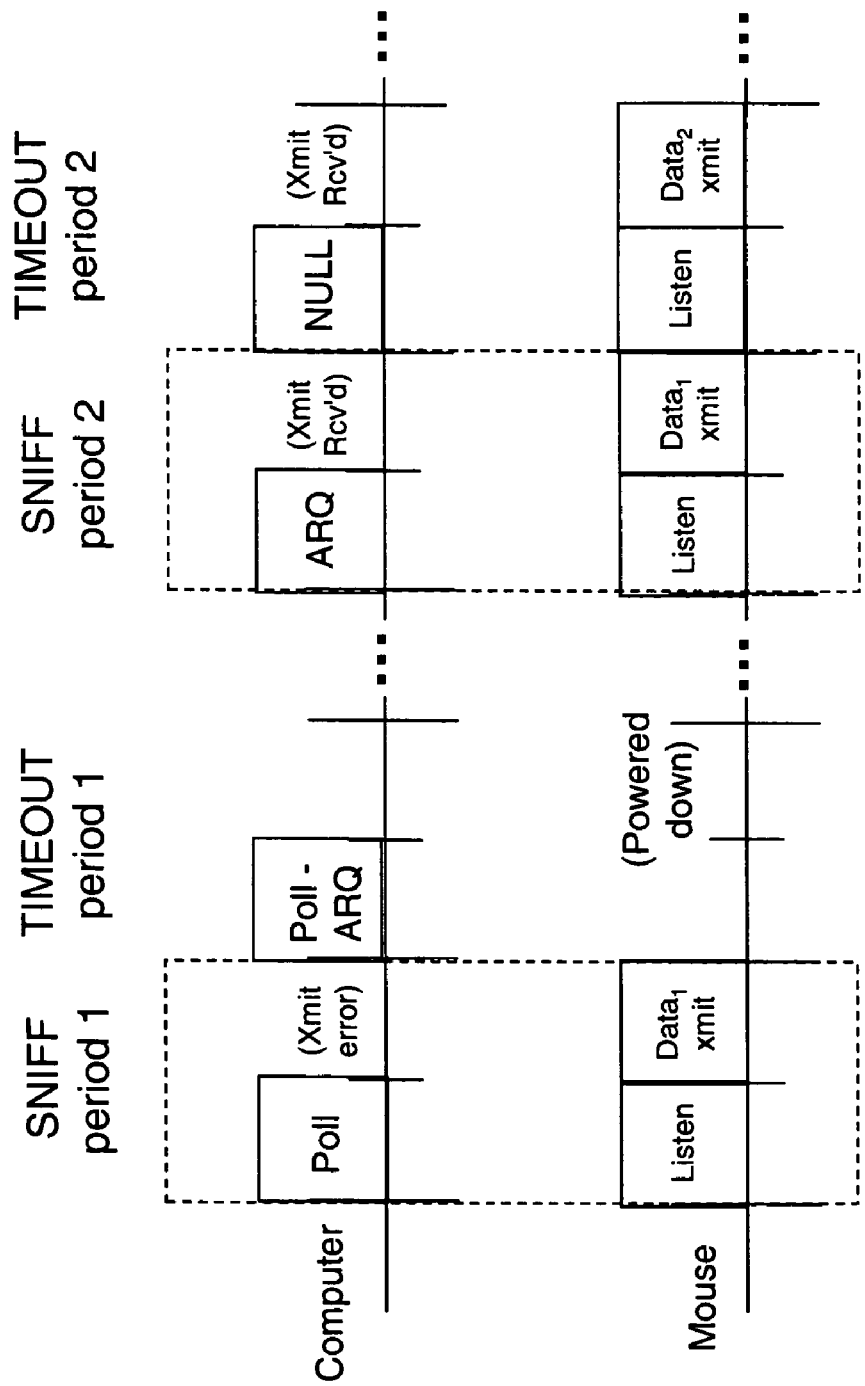
FIG. 8 is a diagram showing another example of power management of a slave device, and in which a slave device transmits a first data packet in a first polling period to a master device that is not successfully received, retransmits the first data packet in a second polling period and transmits a second data packet in a supplemental period associated with the second polling period while reducing power in the time interval between the first and second polling periods.

FIG. 8 illustrates another example of the present invention. In this example, computer 2 transmits a POLL packet to mouse 100 in the first time slot of SNIFF period 1. Mouse 100 has user data to transmit in SNIFF period 1 and responds to the POLL packet by transmitting a user data packet ($Data_1$) to computer 2, after which mouse 100 powers down its transceiver in the first time slot of TIMEOUT period 1. Mouse 100 remains in this powered down condition until the next SNIFF period (illustrated as SNIFF period 2 in this example).

As also shown in FIG. 8, computer 2 did not properly receive the $Data_1$ transmission by mouse 100 during time slot 1 of SNIFF period 1. However, mouse 100 does not receive any ARQ (Automatic Repeat Request) in the first time slot of TIMEOUT period 1 because mouse 100 has powered down and does not receive or respond until the next SNIFF period (SNIFF period 2 in this example).

When the next SNIFF period occurs (SNIFF period 2) and not having received a response to the ARQ transmitted immediately after the prior SNIFF period, computer 2 transmits the ARQ in the first time slot of SNIFF period 2. Mouse 100 (now powered up) receives the ARQ from the computer 2 in the first time slot of SNIFF period 2. As a result, mouse 100 retransmits the user data packet ($Data_1$) to the master device in the second time slot of SNIFF slot 2.

In this example, mouse 100 also has another user data packet ($Data_2$) to be transmitted in SNIFF period 2 in addition to re-transmitting the prior user data packet ($Data_1$) from SNIFF period 1. Therefore, after retransmitting the prior user data packet ($Data_1$) originally transmitted in SNIFF period 1 in the second time slot of SNIFF period 2, mouse 100 transmits the next user data packet ($Data_2$) in the second time slot of TIMEOUT period 2.

In this example, the first user data packet ($Data_1$) is successfully received by computer 2 in the second time slot of SNIFF period 2. Computer 2 notifies mouse 100 that the data packet was successfully received by transmitting a NULL packet to mouse 100 in the first time slot of TIMEOUT period 2. Mouse 100 listens to the piconet during the first time slot of TIMEOUT period 2 and transmits the second user data packet ($Data_2$) to computer 2 in the second time slot of TIMEOUT period 2 in response to receiving the NULL packet from computer 2 confirming successful transmission of $Data_1$. Alternatively, if $Data_1$, were unsuccessfully transmitted during the second time slot of SNIFF period 2, computer 2 would transmit an ARQ to mouse 100 in TIMEOUT period 2 (not shown). Mouse 100 would then retransmit $Data_1$ to computer 2 responsive to that ARQ. In this example, the transmission of $Data_1$ is delayed until the next available time slot.

In another embodiment, mouse 100 may not power down its transceiver during a TIMEOUT if a predetermined number ARQs are received consecutively. If transmission of packets is compromised such that a predetermined number of consecutive packets are not successfully received at the computer 2, the mouse 100 may remain powered on during TIMEOUT until the condition causing the transmission error abates.

Figure 9A:
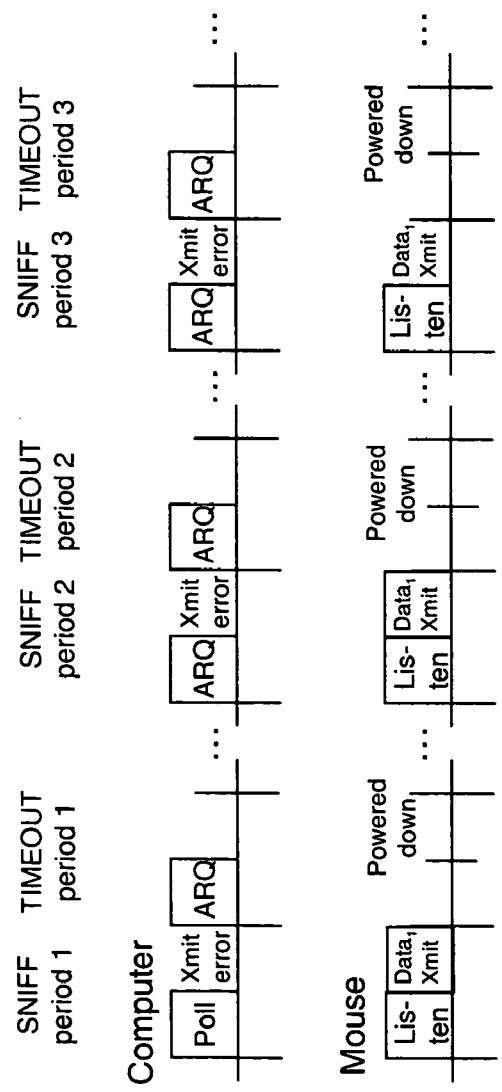
FIGS. 9A and 9B are diagrams showing another example of power management of a slave device, and in which a slave device does not turn off during TIMEOUT periods if a predetermined number of consecutive requests for retransmission of data are received from a master device.
Figure 9B:
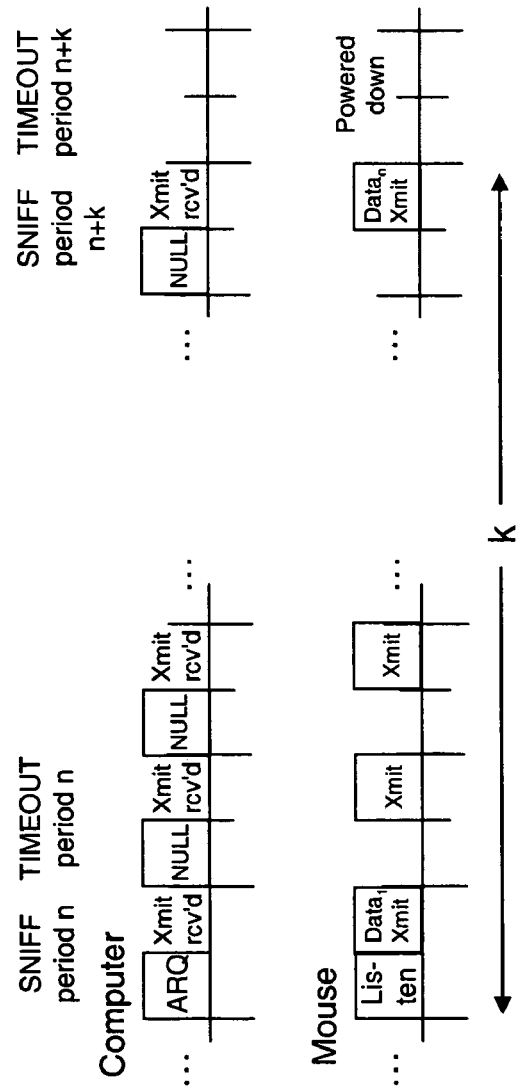

FIGS. 9A and 9B illustrate one example of this embodiment. Computer 2 transmits a POLL packet to mouse 100 in the first time slot of SNIFF period 1. Mouse 100 responds by transmitting a data packet ($Data_1$) of user data to computer 2 in the second time slot of SNIFF period 1. After transmitting the $Data_1$ packet, mouse 100 powers down its transceiver in the first time slot of TIMEOUT period 1. Mouse 100 remains in this powered down condition until the next SNIFF period (illustrated as SNIFF period 2 in this example).

As also shown in FIG. 9A, computer 2 did not properly receive the $Data_1$ transmission by mouse 100 during SNIFF period 1. Accordingly, computer 2 sends an ARQ to mouse 100 in the first time slot of TIMEOUT period 1. However, because mouse 100 has powered down, mouse 100 does not receive the ARQ or respond to the ARQ from computer 2.

As in the previous examples, computer 2 transmits another ARQ in the first time slot of SNIFF period 2. Mouse 100 responds to ARQ by retransmitting the $Data_1$ packet of user data to computer 2 in the second time slot of SNIFF period 2, after which mouse 100 powers down its transceiver to conserve power. However, in this example, there is an error in retransmission of the $Data_1$ packet during the second time slot of SNIFF period 2.

Because the $Data_1$ packet was not received in SNIFF period 2 and because no response was received from the ARQ sent from computer 2 to mouse 100 (which was powered down) during TIMEOUT period 2, computer 2 sends an ARQ in the first time slot of the next SNIFF period (SNIFF period 3 in this example). As FIG. 9A illustrates, mouse 100 responds to the ARQ in SNIFF period 3 by retransmitting the $Data_1$ packet in the second time slot of SNIFF period 3, after which mouse 100 powers down its transceiver to conserve power. As seen in the example of FIG. 9A, continued transmission problems exist, and computer 2 does not receive the transmission. Thus, if mouse 100 had data packets to transmit to computer 2 for at least some of those SNIFF periods, there may be multiple data packets that have not yet been transmitted to computer 2 after several SNIFF periods have elapsed. If mouse 100 detects that computer 2 has sent an ARQ in a predetermined number of consecutive SNIFF cycles, mouse 100 remains powered on during TIMEOUT periods until the problem no longer exists. For example, mouse 100 may remained powered on until the outstanding data packets are transmitted and no subsequent ARQ is received from computer 2.

This is shown in FIG. 9B. After mouse 100 has received an ARQ from the computer 2 in n consecutive SNIFF periods, mouse 100 ceases powering down during TIMEOUT periods. As shown in TIMEOUT period n, mouse 100 receives an ARQ in TIMEOUT period n, slot 1, and resends $Data_1$. Mouse 100 continues to remain powered on during TIMEOUT periods until a designated number of SNIFF periods elapse without receiving an ARQ. As shown in FIG. 9B, after receiving k consecutive SNIFF period polls without an ARQ, mouse 100 again begins powering down during TIMEOUT periods. The parameters n and k can be chosen as necessary for the desired functioning of the network or piconet with the applicable master and slave devices.

The foregoing examples merely illustrate the invention; many modifications may be made that are within the scope of the invention. For example, the preceding illustrations depict computer 2 as transmitting an ARQ in the TIMEOUT periods when the wireless device has powered down. In an alternate embodiment, computer 2 might not send the ARQ to mouse 100 until the next SNIFF period.

Thus, it is understood that aspects of the present invention can take many forms and embodiments. The embodiments shown herein are intended to illustrate rather than to limit the invention, it being appreciated that variations may be made without departing from the spirit and scope of the invention.

The invention claimed is:

1. A method for operating a first device in wireless communication with a second device using a communication protocol having polling periods, each polling period having an associated subsequent supplemental period, each supplemental period being at least reserved for reduction of power consumption of the first device or retransmission of data transmitted during a previous polling period, the method comprising the steps of:

receiving at the first device a first transmission in a first time slot of a first polling period;

transmitting a first response in a second time slot of the first polling period, the first response being responsive to receiving the first transmission;

reducing power consumption of the first device during a first supplemental period associated with and subsequent to the first polling period, substantially following transmitting the first response;

receiving a second transmission in a first time slot of a second polling period, the second transmission indicating that the first response was not properly received;

transmitting a second response during a second time slot of the second polling period, the second response being responsive to receiving the second transmission;

receiving a third transmission in a first time slot of a third polling period, the third transmission indicating that a prior response was not properly received;

transmitting a third response in a second time slot of the third polling period, the third response being responsive to receiving the third transmission;

maintaining power during a third supplemental period associated with the third polling period if each of a predetermined number of prior consecutive transmissions indicated that a response was not properly received; and reducing power consumption in a supplemental period after another predetermined number of polling period transmissions indicating that a prior response was properly received.

2. The method of claim 1 wherein transmitting the second response during the second time slot of the second polling period comprises retransmitting the first response.

3. The method of claim 2 wherein the second response comprises a data packet having user data.

4. The method of claim 2 wherein the second response comprises a packet indicating a lack of user data to be transmitted.

5. The method of claim 4 wherein the packet indicating the lack of user data to be transmitted is a NULL packet.

6. The method of claim 1 wherein the step of reducing power consumption comprises powering off a transceiver.

7. The method of claim 6 wherein the step of reducing power consumption comprises powering off a transceiver such that a transmission indicating that the first response was not properly received cannot be received during the first supplemental period.

8. The method of claim 1 wherein the second transmission is also transmitted during the first supplemental period and the step of reducing power consumption comprises powering off a transceiver such that the second transmission is not received during the first supplemental period.

9. The method of claim 1 wherein the communication protocol is the BLUETOOTH protocol, each polling period is a SNIFF period and the associated subsequent supplemental period is a TIMEOUT period.

10. A wireless device comprising a battery power source;
a radio transceiver powered by the battery;
a memory having instructions stored thereon; and
a controller coupled to the radio transceiver and to the memory and configured to execute instructions for operating a first device in wireless communication with a second device using a communication protocol having polling periods, each polling period having an associated subsequent supplemental period, each supplemental period being at least reserved for reduction of power consumption of the first device or retransmission of data transmitted during a previous polling period, so as to:

receive at the first device a first transmission in a first time slot of a first polling period;

transmit a first response in a second time slot of the first polling period, the first response being responsive to receiving the first transmission;

reduce power consumption of the first device during a first supplemental period associated with and subsequent to the first polling period, substantially following transmitting the first response;

receive a second transmission in a first time slot of a second polling period, the second transmission indicating that the first response was not properly received;

transmit a second response during a second time slot of the second polling period, the second response being responsive to receiving the second transmission;

receive a third transmission in a first time slot of a third polling period, the third transmission indicating that a prior response was not properly received;

transmit a third response in a second time slot of the third polling period, the third response being responsive to receiving the third transmission;

maintain power during a third supplemental period associated with the third polling period if each of a predetermined number of prior consecutive transmissions indicated that a response was not properly received; and reduce power consumption in a supplemental period after another predetermined number of transmissions indicating that a prior response was properly received.

11. The wireless device of claim 10 wherein the controller retransmits the first response when the controller transmits the second response during the second time slot of the second polling period.

12. The wireless device of claim 11 wherein the second response comprises one of a data packet and a packet indicating the lack of data to be transmitted.

13. The wireless device of claim 10 wherein the wireless device is selected from the group consisting of a mouse and a keyboard.

14. A computer-readable medium having stored thereon data representing sequences of instructions for operating a first device in wireless communication with a second device using a communication protocol having polling periods, each polling period having an associated subsequent supplemental period, each supplemental period being at least reserved for reduction of power consumption of the first device or retransmission of data transmitted during a previous polling period, the sequences of instructions, when executed by a processor, cause the processor to perform steps comprising:

receiving at the first device a first transmission in a first time slot of a first polling period;

transmitting a first response in a second time slot of the first polling period, the first response being responsive to receiving the first transmission;

reducing power consumption of the first device during a first supplemental period associated with and subsequent to the first polling period, substantially following transmitting the first response;

receiving a second transmission in a first time slot of a second polling period, the second transmission indicating that the first response was not properly received;

transmitting a second response during a second time slot of the second polling period, the second response being responsive to receiving the second transmission;

receiving a third transmission in a first time slot of a third polling period, the third transmission indicating that a prior response was not properly received;

transmitting a third response in a second time slot of the third polling period, the third response being responsive to receiving the third transmission;

maintaining power during a third supplemental period associated with the third polling period if each of a predetermined number of prior consecutive transmissions indicated that a response was not properly received; and reducing power consumption in a supplemental period after another predetermined number of transmissions indicating that a prior response was properly received.

15. The computer-readable medium of claim 14 wherein transmitting the second response during the second time slot of the second polling period comprises retransmitting the first response.

16. The computer-readable medium of claim 15 wherein the second response comprises a data packet.

17. The computer-readable medium of claim 15 wherein the second response comprises a packet indicating the lack of data to be transmitted.

18. The computer-readable medium of claim 14 wherein the step of reducing power consumption comprises powering off a transceiver such that a transmission indicating that the first response was not properly received cannot be received during the first supplemental period.

19. A method for operating a slave device in wireless communication with a master device using a communication protocol having a plurality of sniff periods associated respectively with timeout periods, each timeout period being subsequent to each respective sniff period, comprising:

polling the slave device during a first time slot of a first sniff period by transmitting a first poll packet from the master device to the slave device;

transmitting a first transmission of a first data packet from the slave device to the master device during a second time slot of the first sniff period in response to the slave device receiving the first poll packet during the first time slot of the first sniff period;

reducing power consumption of the slave device substantially following the first transmission of the first data packet, the reduced power consumption being sustained at least during a first timeout period subsequent to the first sniff period;

restoring power consumption of the slave device after the first timeout period;

receiving at the slave device a transmission error indication from the master device during a first time slot of a second sniff period indicating that the first data packet was not properly received by the master device;

transmitting a second transmission of the first data packet from the slave device to the master device during a second time slot of the second sniff period in response to the received transmission error indication;

reducing power consumption of the slave device substantially following the second transmission of the first data packet, the reduced power consumption being sustained at least during a second timeout period;

for each subsequent sniff period, receiving at the slave device from the master device either a poll packet polling the slave device for data or a transmission error indication indicating that a previously transmitted data packet was not properly received by the master device, wherein:

when a slave device receives a predetermined number of transmission error indications in a predetermined number of consecutive sniff periods, the slave device maintains power during subsequent sniff and timeout periods such that user data acquired by the slave device during the consecutive sniff and timeout periods can be transmitted in substantially consecutive data packets to the master device.

20. The method according to claim 19, wherein if the second transmission of the first data packet is properly received by the master device, the slave device transmits a second data packet to the master device substantially following the second transmission of the first data packet during a second timeout period subsequent to the second time slot of the second sniff period.

21. The method according to claim 19, wherein if the first data packet was a null data packet indicating a lack of user data to be transmitted and the slave device has acquired user data between an end of the first sniff period and a beginning of the second sniff period, the second transmission of the first data packet comprises transmission of the user data.

\* \* \* \* \*